United States Patent
Cha et al.

(10) Patent No.: US 11,217,836 B2
(45) Date of Patent: Jan. 4, 2022

(54) COOLING JACKET HAVING NONUNIFORM FLOW PATHS, FOR COOLING BATTERY CELL SURFACE, AND BATTERY MODULE INCLUDING SAME

(71) Applicant: LG Chem, Ltd., Seoul (KR)

(72) Inventors: Hun Cha, Daejeon (KR); Sang-Il Son, Daejeon (KR); Yong-Seok Choi, Daejeon (KR); Sang-Woo Ryu, Daejeon (KR)

(73) Assignee: LG Chem, Ltd.

( * ) Notice: Subject to any disclaimer, the term of this patent is extended or adjusted under 35 U.S.C. 154(b) by 184 days.

(21) Appl. No.: 16/489,041

(22) PCT Filed: Aug. 9, 2018

(86) PCT No.: PCT/KR2018/009118
§ 371 (c)(1),
(2) Date: Aug. 27, 2019

(87) PCT Pub. No.: WO2019/066244
PCT Pub. Date: Apr. 4, 2019

(65) Prior Publication Data
US 2020/0006820 A1     Jan. 2, 2020

(30) Foreign Application Priority Data

Sep. 29, 2017   (KR) .................. 10-2017-0127474

(51) Int. Cl.
*H01M 10/00*     (2006.01)
*H01M 10/613*    (2014.01)
(Continued)

(52) U.S. Cl.
CPC ....... *H01M 10/613* (2015.04); *H01M 10/647* (2015.04); *H01M 10/6555* (2015.04); *H01M 10/6556* (2015.04)

(58) Field of Classification Search
None
See application file for complete search history.

(56) References Cited

U.S. PATENT DOCUMENTS

| 2006/0049799 A1 | 3/2006 | Hamada et al. |
| 2008/0008916 A1 | 1/2008 | Shin et al. |
| (Continued) | | |

FOREIGN PATENT DOCUMENTS

| DE | 102013005475 A1 | 10/2014 |
| JP | 20099853 A | 1/2009 |
| (Continued) | | |

OTHER PUBLICATIONS

Extended European Search Report with Written Opinion for Application No. 18861668.4 dated May 19, 2020, 7 pages.

(Continued)

*Primary Examiner* — Raymond Alejandro
(74) *Attorney, Agent, or Firm* — Lerner, David, Littenberg, Krumholz & Mentlik, LLP (57) ABSTRACT

Disclosed is a cooling jacket configured to be disposed close to one surface of a battery cell to absorb heat of the battery cell, the cooling jacket including a cooling plate and a plurality of cooling channels extending therein. The plurality of cooling channels include a coolant supply manifold channel and a coolant discharge manifold channel respectively disposed at first and second sides of the cooling plate and each extending in a longitudinal direction from an inside of the cooling plate to an outside of the cooling plate so that one end thereof is exposed to the outside of the cooling plate; and non-uniform cooling channels spaced apart from each other by a predetermined distance and each having first and second ends respectively connected to the coolant supply manifold channel and the coolant discharge manifold (Continued)

channel, the non-uniform cooling channels having widths that are non-uniform in the longitudinal direction.

7 Claims, 7 Drawing Sheets

(51) Int. Cl.
*H01M 10/647* (2014.01)
*H01M 10/6555* (2014.01)
*H01M 10/6556* (2014.01)

(56) References Cited

U.S. PATENT DOCUMENTS

| | | | |
|---|---|---|---|
| 2012/0028156 A1 | 2/2012 | Song et al. | |
| 2013/0192807 A1 | 8/2013 | DeKeuster | |
| 2014/0272496 A1* | 9/2014 | Han | H01M 10/613 |
| | | | 429/83 |
| 2016/0079640 A1 | 3/2016 | Kim | |
| 2016/0149277 A1 | 5/2016 | Kim et al. | |
| 2017/0122679 A1 | 5/2017 | Kenney et al. | |
| 2017/0194681 A1 | 7/2017 | Kim et al. | |

FOREIGN PATENT DOCUMENTS

| | | |
|---|---|---|
| JP | 2012190674 A | 10/2012 |
| KR | 100745738 B1 | 7/2007 |
| KR | 20120012303 A | 2/2012 |
| KR | 20150137262 A | 12/2015 |
| KR | 20150140121 A | 12/2015 |
| KR | 20160026029 A | 3/2016 |
| KR | 20160030724 A | 3/2016 |
| KR | 20160046474 A | 4/2016 |
| KR | 20160117955 A | 10/2016 |
| KR | 20170098590 A | 8/2017 |

OTHER PUBLICATIONS

International Seach Report for Application No. PCT/KR2018/009118 dated Nov. 26, 2018, 2 pages.

* cited by examiner

COOLING JACKET HAVING NONUNIFORM FLOW PATHS, FOR COOLING BATTERY CELL SURFACE, AND BATTERY MODULE INCLUDING SAME

CROSS-REFERENCE TO RELATED APPLICATIONS

The present application is a national phase entry under 35 U.S.C. § 371 of International Patent Application No. PCT/KR2018/009118, filed on Aug. 9, 2018, published in Korean, which claims priority from Korean Patent Application No. 10-2017-0127474, filed on Sep. 29, 2017, the disclosures of which are hereby incorporated herein by reference.

TECHNICAL FIELD

The present disclosure relates to a cooling jacket for cooling a surface of a battery cell, and more particularly, to a cooling jacket optimized to cool a battery cell that exhibits a non-uniform heat generation pattern depending on regions due to an electrode lead portion having a greatest heat generation, and a battery module including the cooling jacket.

BACKGROUND ART

A secondary battery cell includes positive and negative electrode current collectors, a separator, active materials and an electrolyte, and may be repeatedly charged and discharged by electrochemical reactions between components. Since the battery cells are densely provided in a compact space of a battery module, it is important to easily release the heat generated by each battery cell. Since the battery cell is charged and discharged due to an electrochemical reaction, if the heat of the battery module generated during the charging and discharging process is not effectively removed, heat accumulation occurs, which may promote the degradation of the battery module, and in more severe cases, cause ignition or explosion.

Thus, a high-output large-capacity battery module and a battery pack having the battery module are required to have a cooling device for cooling battery cells included therein. Generally, the cooling device may adopt two cooling types, namely indirect air cooling and indirect water cooling. The indirect air cooling uses a simple structure, but its cooling performance is somewhat low and the battery module has a low energy density.

The indirect water cooling has better cooling performance than the air cooling but is insufficient to satisfy the cooling performance required by a battery module or a battery pack of a high heat generation condition due to a heat transfer path or the like.

Figure 1:
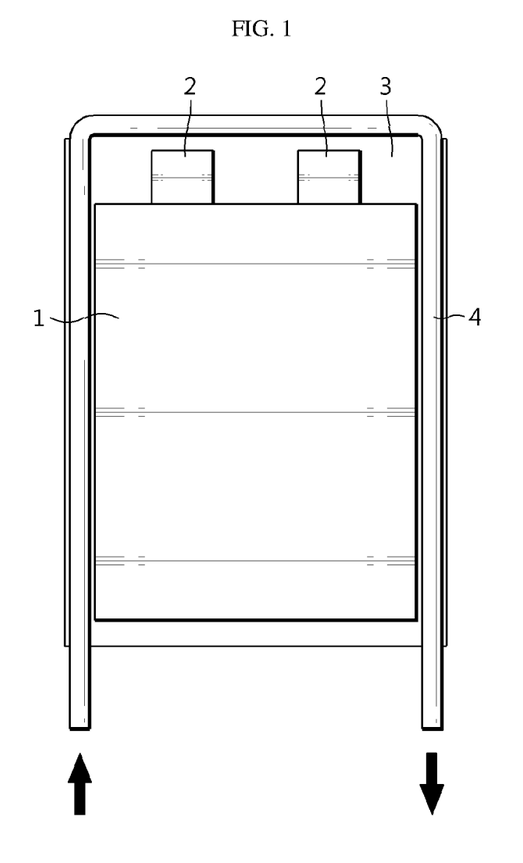
FIG. 1 is a diagram schematically showing a cooling structure of a conventional perimeter cooling plate.

FIG. 1 is a diagram for illustrating a method for cooling a battery cell 1 by using a conventional perimeter cooling plate. Referring to FIG. 1, the perimeter cooling plate includes a thermally conductive sheet-type plate 3 made of aluminum or aluminum alloy and a cooling tube 4 forming a coolant flow path at an edge of the sheet-type plate. A coolant is supplied to the cooling tube 4 in a state where the battery cell 1 is in contact with one surface of the perimeter cooling plate, to absorb the heat of the battery cell 1. The perimeter cooling plate has better cooling performance in comparison to existing general cooling plates.

Meanwhile, since the electrode lead (2) of the battery cell serves as a terminal electrically connected to an external device or other battery cells, an adjacent portion of the electrode lead generates the greatest heat. Thus, seeing the heat generation pattern of the battery cell, a non-uniform heat generation pattern where the temperature is higher as being closer to the electrode lead is exhibited, even though there is a somewhat difference.

However, since the perimeter cooling plate is designed without considering the non-uniform heat generation pattern inside the battery cell as described above, the temperature deviation inside the battery cell is still large even when the perimeter cooling plate is used. Thus, it is necessary to design a new cooling plate that is capable of cooling a high-temperature portion inside the battery cell more effectively.

DISCLOSURE

Technical Problem

The present disclosure is designed to solve the problems of the related art, and therefore the present disclosure is directed to providing a cooling jacket for cooling a battery cell, which may reduce a temperature deviation according to a non-uniform heat generation pattern of the battery cell, and a battery module including the cooling jacket.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cooling jacket configured to be disposed close to one surface of a battery cell to absorb heat of the battery cell, the cooling jacket including a cooling plate defining a plate shape and a plurality of cooling channels extending within the cooling plate, wherein the plurality of cooling channels include a coolant supply manifold channel and a coolant discharge manifold channel respectively disposed at first and second sides of the cooling plate and each extending in a longitudinal direction from an inside of the cooling plate to an outside of the cooling plate so that one end thereof is exposed to the outside of the cooling plate; and non-uniform cooling channels spaced apart from each other by a predetermined distance and each having first and second ends respectively connected to the coolant supply manifold channel and the coolant discharge manifold channel, the non-uniform cooling channels having widths that are non-uniform in the longitudinal direction.

A first subset of the non-uniform cooling channels are located inside a first low-temperature portion of the cooling plate configured to be in contact with a drawing portion of an electrode lead of the battery cell and a second subset of the non-uniform cooling channels are located inside another portion of the cooling plate, and the widths of the cooling channels located in the first subset may be greater than the widths of the cooling channels located in the second subset.

The at least some of the second subset of the non-uniform cooling channels may be located in a second low-temperature portion of the cooling plate, which corresponds to a central region of the cooling plate, and the widths of the cooling channels may be gradually increased from the second low-temperature portion of the cooling plate toward the first low-temperature portion of the cooling plate.

Each of the plurality of non-uniform cooling channels may have a tubular shape and may be embedded inside of the cooling plate.

The cooling plate may have first and second edge portions respectively formed at the first and second sides of the cooling plate and each extending in the longitudinal direction of the cooling plate, the first and second edge portions of the cooling plate each having a thickness that is greater than a thickness of other portions of the cooling plate in a height direction perpendicular to the longitudinal direction.

The plurality of cooling channels may be formed integrally with the cooling plate.

The cooling jacket may further comprise first and second flexible connection tubes respectively coupled to an opening of the coolant supply manifold channel and an opening of the coolant discharge manifold channel.

The non-uniform cooling channels may be disposed to intersect the coolant supply manifold channel and the coolant discharge manifold channel.

The first and second ends of each of the non-uniform cooling channels may have a rounded shape.

In another aspect of the present disclosure, there may also be provided a battery module, comprising: a plurality of the cooling jackets each as described above, and a plurality of battery cells interleaved with the cooling jackets, such that each battery cell closely contacts an upper surface of a lower adjacent one of the cooling jackets and a lower surface of an upper adjacent one of the cooling jackets; and stacking frames supporting the cooling jackets and the battery cells and assembled with each other so as to be stacked in a height direction perpendicular to the longitudinal direction, wherein the stacking frames together form first and second holes extending in the height direction that respectively serve as a coolant supply tube and a coolant discharge tube, and the one end of the coolant supply manifold channel and the one end of the coolant discharge manifold channel are respectively connected to the coolant supply tube and the coolant discharge tube.

Advantageous Effects

According to an embodiment of the present disclosure, since the cooling channel width of the cooling jacket is expanded as being closer to the electrode lead so that a flow rate of the coolant increases, a high-temperature portion inside the battery cell may be effectively cooled. Thus, the temperature deviation inside the battery cell may be remarkably reduced.

In addition, since a plurality of cooling channels are provided inside the cooling jacket, the heat transfer path is reduced in comparison to a conventional perimeter cooling plate, and thus the thermal conductivity may be greatly improved.

According to another embodiment of the present disclosure, by using the cooling jacket as described above, it is possible to provide a battery module having excellent safety and life characteristics due to high cooling performance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, in the description of the present disclosure, a detailed description of the related configuration or function is omitted if it is determined that the gist of the present disclosure may be obscured by the description.

Figure 2:
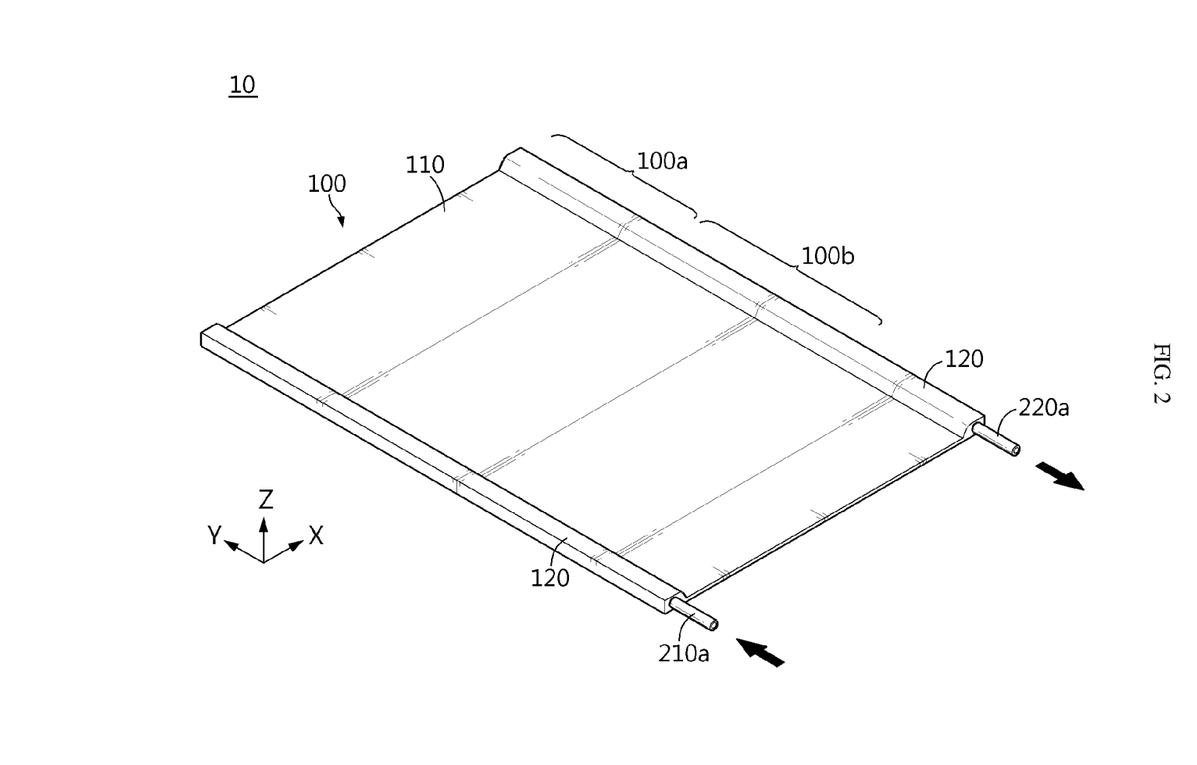
FIG. 2 is a perspective view showing a cooling jacket according to an embodiment of the present disclosure.
Figure 3:
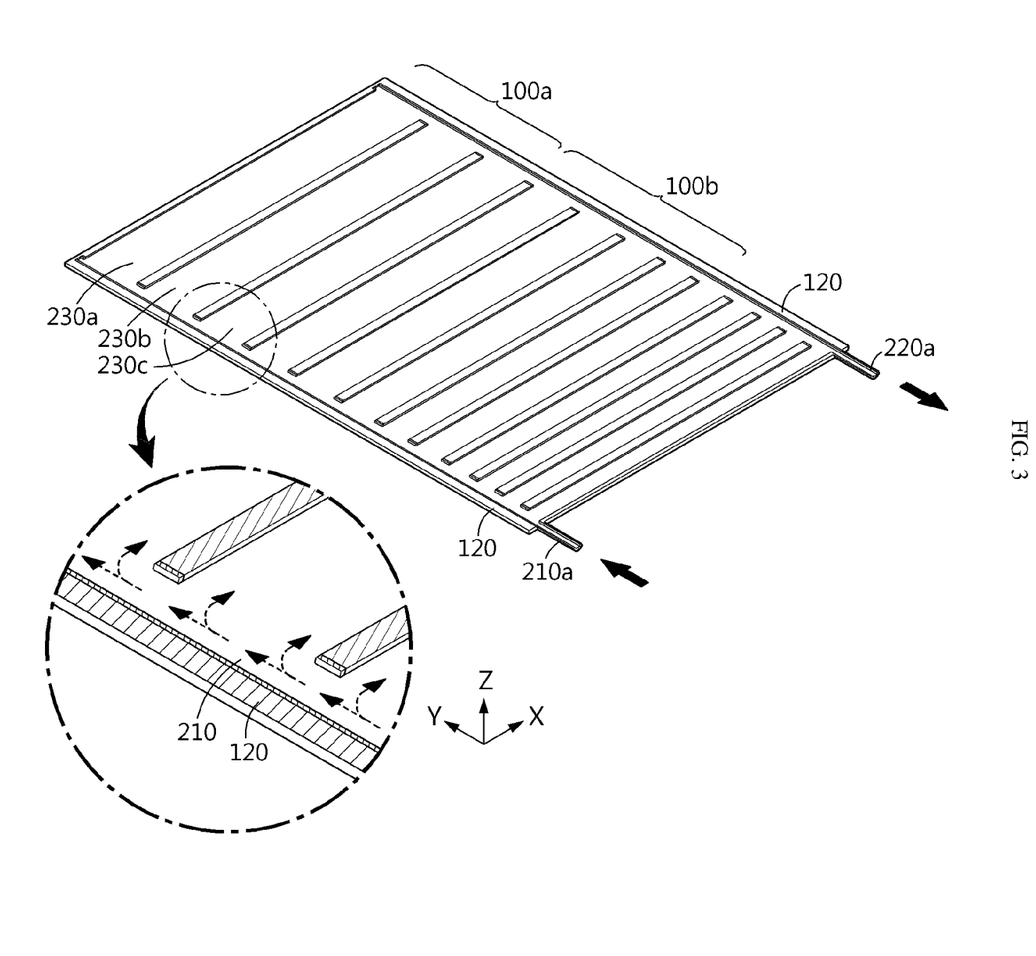
FIG. 3 is a perspective view showing an inner configuration of the cooling jacket of FIG. 2.
Figure 4:
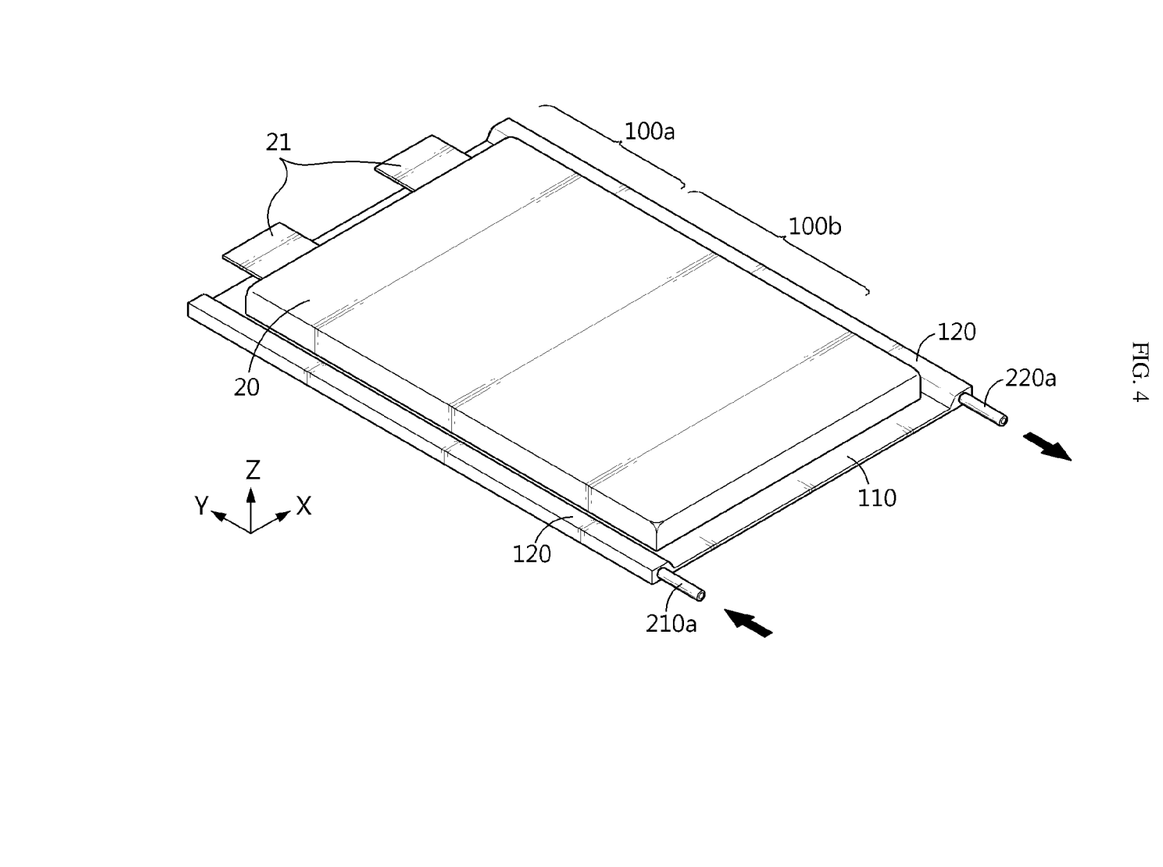
FIG. 4 is a perspective view showing that a battery cell is disposed at the cooling jacket of FIG. 2.

FIG. 2 is a perspective view showing a cooling jacket according to an embodiment of the present disclosure, FIG. 3 is a perspective view showing an inner configuration of the cooling jacket of FIG. 2, and FIG. 4 is a perspective view showing that a battery cell is disposed at the cooling jacket of FIG. 2.

Referring to FIGS. 2 to 4, a cooling jacket 10 for cooling a battery cell 20 according to an embodiment of the present disclosure may include a plate-shaped cooling plate 100 and a plurality of cooling channels 200 provided inside the cooling plate 100. Here, the battery cell 20 may be a pouch-type secondary battery.

As will be explained later in detail, the cooling jacket 10 of the present disclosure has an excellent cooling performance due to a short heat transfer path as compared with a conventional perimeter cooling plate, and may reduce the temperature deviation inside the battery cell 20, thereby further extending the life span of the battery cell 20.

Specifically, seeing the configuration of the cooling jacket 10, the cooling plate 100 may be provided in the form of a metal sheet-type plate. The metal material may be an aluminum or aluminum alloy with high thermal conductivity and a light weight among metals. However, without being limited thereto, a plastic material such as polyethylene with low thermal conductivity may also be used. Metal materials such as copper, gold and silver or non-metallic ceramic materials such as aluminum nitride and silicon carbide with very high thermal conductivity may also be used.

The cooling plate 100 may include a planar portion 110 having a wide flat shape and edge portions 120 respectively formed at both sides of the planar portion 110 and having a greater thickness than the planar portion 110. A battery cell 20 may be placed on the cooling plate 100 so that one surface of the battery cell 20 is brought into close contact with the planar portion 110 of the cooling plate 100. For example, one battery cell 20 may be closely disposed on the upper surface and the lower surface of the cooling plate 100, respectively, and the cooling plate 100 and the battery cell 20 may exchange heat in this state.

The edge portion 120 of the cooling plate 100 may be provided to extend from one end to the other end along a longitudinal direction of the cooling plate 100, namely a vertical direction (a Y-axis direction). The distance between both edge portions 120 may be determined in advance according to the width of the battery cell 20 to be cooled. In this case, the battery cell 20 is positioned between both edge portions 120. Here, the edge portions 120 may prevent the battery cell 20 from moving in a left and right direction, and the battery cell 20 may be correctly guided by both edge portions 120 without being distorted, when being disposed on the cooling plate 100.

As shown in FIG. 2, the edge portion 120 may be provided in the form of, for example, a bar to support and mechanically reinforce the planar portion of the cooling plate 100 with a thin design.

Also, as will be explained later, a coolant supply manifold channel 210 and a coolant discharge manifold channel 220 may be located inside the edge portions 120. Since the edge portions 120 of the cooling plate 100 are formed thicker than the planar portion, the edge portions 120 may accommodate the coolant supply manifold channel 210 and the coolant discharge manifold channel 220 with a relatively large diameter.

The coolant supply manifold channel 210 and the coolant discharge manifold channel 220 serve as passages for supplying and discharging a coolant into and out of the cooling plate 100. In order to smoothly supply the coolant to the cooling plate 100, the cooling plate 100 may have as a greater diameter as possible.

Figure 5:
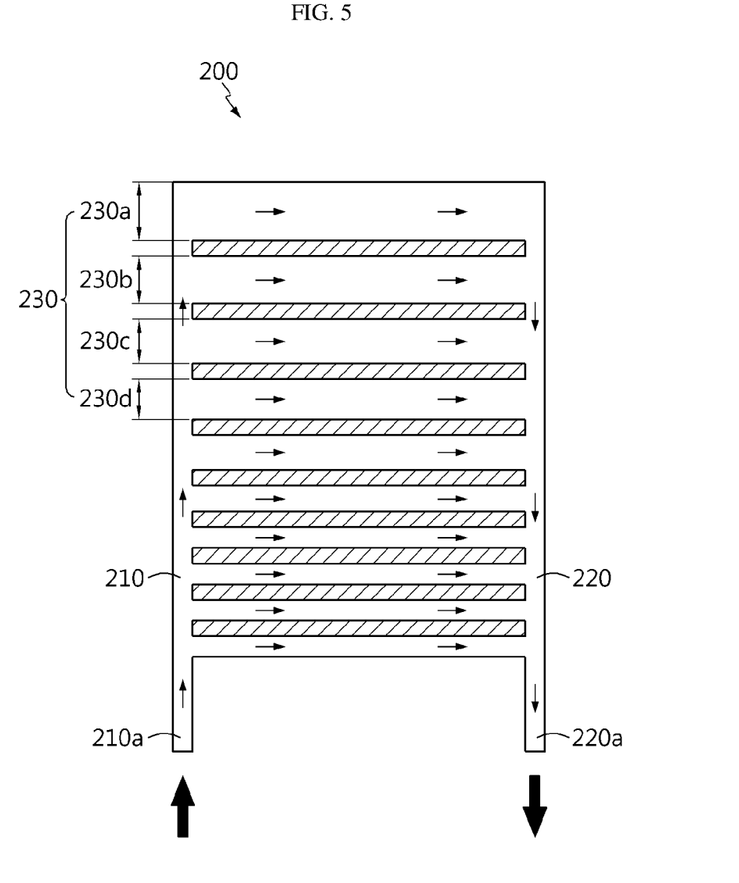
FIG. 5 is a diagram showing a plurality of cooling channels according to an embodiment of the present disclosure.

Referring to FIGS. 3 and 5 together, the plurality of cooling channels 200 may include a coolant supply manifold channel 210, a coolant discharge manifold channel 220 and non-uniform cooling channels 230. The plurality of cooling channels 200 have a tubular shape through which the coolant may flow, and may be embedded inside the cooling plate 100.

More specifically, the coolant supply manifold channel 210 and the coolant discharge manifold channel 220 may be respectively located inside the edge portions 120 of the cooling plate 100 as described above, and the non-uniform cooling channels 230 may be located inside the planar portion 110 of the cooling plate.

For example, the coolant supply manifold channel 210 and the coolant discharge manifold channel 220 may be disposed to extend along the vertical direction of the cooling plate 100 in the form of a cylindrical pipe, and the non-uniform cooling channels 230 having a thin film form may be disposed to extend the horizontal direction of the cooling plate 100 in a thin pipe shape so as to be embedded inside the planar portion 110 of the cooling plate. As will be explained later in detail, the non-uniform cooling channels 230 are basically formed to have great widths compared to thickness, but the widths may be non-uniform.

One end 210a of the coolant supply manifold channel and one end 220a of the coolant discharge manifold channel may extend from the inside of the cooling plate 100 to the outside. One end 210a of the coolant supply manifold channel and one end 220a of the coolant discharge manifold channel extending outward may be connected to an external tube such as a coolant supply tube or a coolant discharge tube. Though not shown in detail for convenience of illustration, the coolant supply manifold channel 210 and the coolant discharge manifold channel 220 may include a plurality of connection ports formed on the paths thereof, so that the non-uniform cooling channels 230 may be connected thereto.

The non-uniform cooling channels 230 are disposed to be spaced apart from each other by a predetermined distance and cross the planar portion 110 of the cooling plate in a horizontal direction (an X-axis direction), and both ends of the non-uniform cooling channels 230 may be connected to the coolant supply manifold channel 210 and the discharge manifold channel 220, respectively.

According to this configuration, the coolant may be introduced through the coolant supply manifold channel 210 from the outside of the cooling jacket 10, flow along the edge portions 120 of the cooling plate 100, and be branched to the non-uniform cooling channels 230 to rapidly cool the planar portion of the cooling plate 100 as a whole. In addition, the coolant passing through the non-uniform cooling channels 230 may be discharged out of the cooling jacket 10 through the coolant discharge manifold channel 220.

Meanwhile, the non-uniform cooling channels 230 of this embodiment may be formed to have non-uniform widths depending on the positions at which they are disposed.

For example, in the one-directional battery cell 20 as shown in FIG. 4, two electrode leads 21 may be oriented in the same direction and the portion where the electrode leads 21 are located may be placed in a first low-temperature portion 100a of the cooling plate. Here, as shown in FIGS. 3 and 4, the first low-temperature portion 100a of the cooling plate means a region that is in contact with a drawing portion of the electrode lead 21 of the battery cell 20 when the battery cell 20 is placed on the cooling jacket 10, and a second low-temperature portion 100b of the cooling plate 100 is conceptually defined to mean a central region of the cooling plate 100.

In this embodiment, the first low-temperature portion 100a is provided to one region in the cooling plate 100, since the non-uniform cooling channels 230 are designed in consideration of the positions of the electrode leads 21 on the assumption that a positive electrode lead and a negative electrode lead are adjacent to each other in the one-directional battery cell 20. Namely, if the cooling jacket is fabricated based on a bidirectional battery cell at which a positive electrode lead and a negative electrode lead are spaced from each other in opposite directions, the non-uniform cooling channels 230 may be designed so that the first low-temperature portion 100a is provided to two regions according to the positions where the positive electrode lead and the negative electrode lead are placed.

Seeing this embodiment in detail with reference to FIG. 5, the non-uniform cooling channels 230 inside the first low-temperature portion 100a are formed to have a greater width than the non-uniform cooling channels 230 in the other portions. The non-uniform cooling channels 230 have widths gradually increasing from the second low-temperature portion 100b of the cooling plate 100 toward the first low-temperature portion 100a, and the widths of the second low-temperature portion 100b do not vary greatly toward a coolant inlet and a coolant outlet.

For example, a first non-uniform cooling channel 230a located at an outermost side, and second, third and fourth non-uniform cooling channels 230b, 230c, 230d located next thereto may be formed to have greater widths step by step. In addition, in the one-directional battery cell 20, fifth and subsequent non-uniform cooling channels 230 may have substantially uniform widths, considering that the heat generation is relatively smaller as being farther from the electrode lead 21.

If the widths of the non-uniform cooling channels 230 inside the cooling plate 100 are gradually increased from one end to the other end of the cooling plate 100, the flow rate of the coolant respectively flowing through the cross sections of the non-uniform cooling channels 230 is gradually increased, so that the non-uniform cooling channel 230a at the outermost side has the largest heat capacity. Thus, in the cooling plate 100, it may be regarded that the first low-temperature portion 100a has a relatively higher heat capacity than the second low-temperature portion 100b.

As explained above, the battery cell 20 has a heat generation pattern in which the heat generation is greatest as being closest to the electrode lead 21. Thus, the first low-temperature portion 100a of the cooling plate having the largest heat capacity may be disposed to face the portion adjacent to the electrode lead 21 of the battery cell 20 so that the temperature of the portion adjacent to the electrode lead 21 is lowered to the level of the other portions.

Since the non-uniform cooling channels 230 of the present disclosure are configured to provide a differential flow rate corresponding to the heat generation pattern inside the battery cell 20 as described above, it is possible to reduce the temperature deviation in the battery cell 20. Also, the cooling jacket 10 of the present disclosure may give excellent cooling performance since the heat transfer path is improved compared to the conventional perimeter cooling plate by embedding the plurality of cooling channels 200 in the cooling plate 100.

In addition, according to the configuration of the plurality of cooling channels 200 of the presenting disclosure, since the cross-sectional area of the entire flow path is larger than that of the conventional perimeter cooling plate, even though the flow rate is slowed at a flow rate of 1 LPM (Litter per Minute) per module, the coolant pressure drop is reduced compared to the conventional perimeter cooling plate. For this reason, it is possible to circulate the coolant even though a low-output coolant circulation pump is used.

Next, the configuration of the cooling jacket 10 according to the present disclosure will be described briefly. The same reference sign denotes the same component, and the same component will not described in detail. The following description will be focused on features different from those of the former embodiment.

Figure 6:
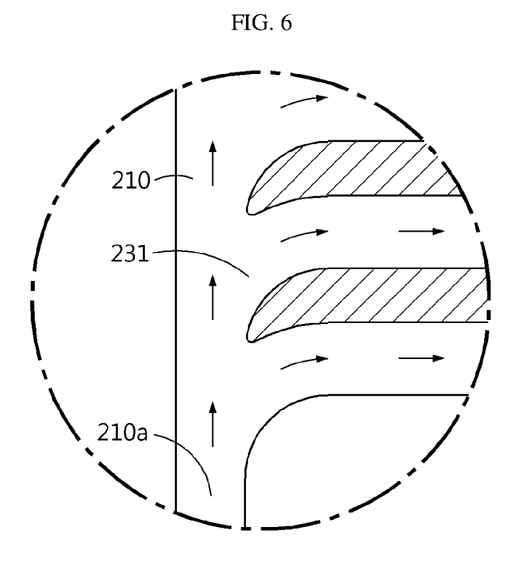
FIG. 6 is a diagram showing a connection portion of a non-uniform cooling channel according to another embodiment of the present disclosure.

FIG. 6 is a diagram showing a connection portion of a non-uniform cooling channel according to another embodiment of the present disclosure.

Referring to FIG. 6, in the cooling jacket 10 according to another embodiment of the present disclosure, both ends forming connection portions 231 of the non-uniform cooling channels 230 may have a rounded shape and be connected to the coolant supply manifold channel 210 and the coolant discharge manifold channel 220, respectively.

For example, the non-uniform cooling channels 230 may be configured to have a straight line region and a curved line region. Since the curved line region is provided between the straight line of the coolant supply manifold channel 210 and the straight line region of the non-uniform cooling channels 230, it is possible to mitigate the vortex formation and reduce the frictional force at the branched point where the coolant flow is changed as compared with the former embodiment. As a result, it is possible to prevent the flow rate from being lowered since the coolant may flow smoothly in the cooling channel.

Figure 7:
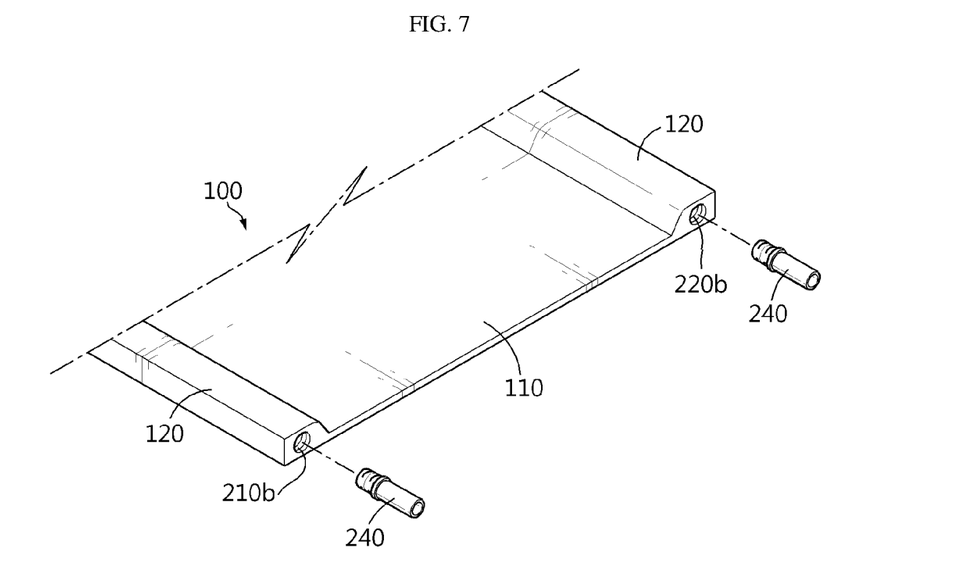
FIG. 7 is a diagram showing a part of the plurality of cooling channels according to still another embodiment of the present disclosure.

FIG. 7 is a diagram showing a part of the plurality of cooling channels according to still another embodiment of the present disclosure.

According to still another embodiment of the present disclosure, the plurality of cooling channels 200 and the cooling plate 100 may be integrally formed. In other words, different from the former embodiments where the plurality of cooling channels 200 are prepared as separate components and then embedded in the cooling plate 100, in the cooling jacket of this embodiment, flow paths corresponding to the plurality of cooling channels 200 are integrally formed inside the cooling plate 100.

The cooling jacket of this embodiment may further include connection tubes 240 that may be respectively coupled to an opening 210b of the coolant supply manifold channel and an opening 220b of the coolant discharge manifold channel to facilitate connection with an external coolant supply and discharge tube. The connection tube 240 may be made of a flexible material whose shape is deformable. If the connection tube 240 is used, it is easier to connect the cooling jacket 10 to the external coolant supply and discharge tube.

Figure 8:
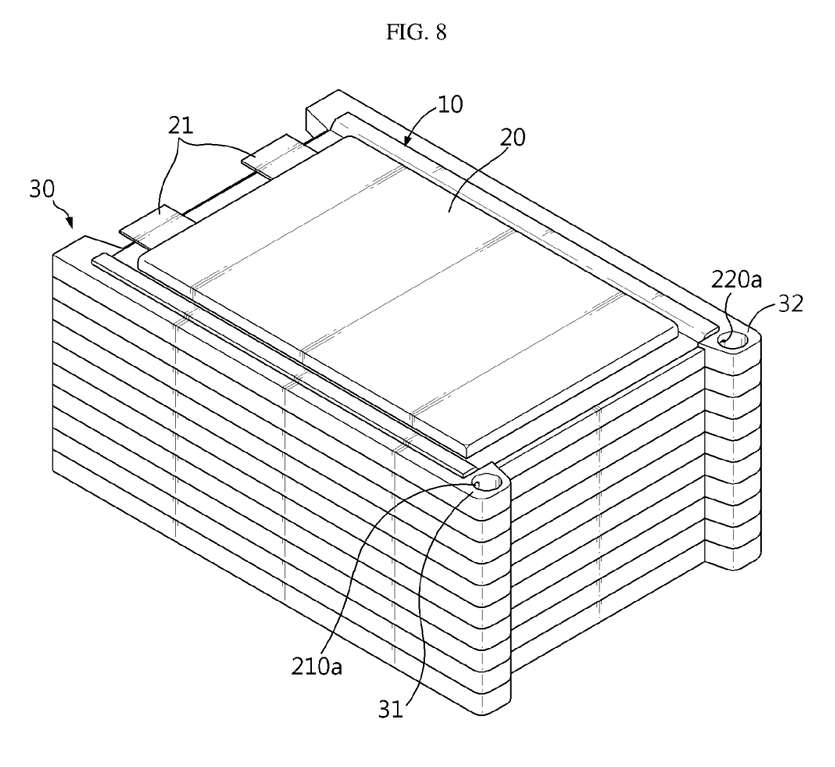
FIG. 8 is a perspective view schematically showing a battery module according to an embodiment of the present disclosure.

FIG. 8 is a perspective view schematically showing a battery module according to an embodiment of the present disclosure.

Referring to FIG. 8, a battery module according to the present disclosure may include cooling jackets 10 as described above, battery cells 20 disposed in close contact with the upper surface and the lower surface of the cooling jackets 10, and stacking frames 30 respectively configured to support the cooling jackets 10 and the battery cells 20 and provided to be assembled with each other so as to be stacked in one direction.

The stacking frames 30 serve to stack the battery cells 20 and hold the battery cells 20 not to move. Also, the stacking frames 30 are configured to be stacked on one another so that the battery cells 20 are guided to be assembled.

The stacking frames 30 may be assembled with each other, for example, in a snap-fit manner. In addition, the stacking frames 30 may have tube forming holes 31, 32 at one side thereof, respectively, so that the tube forming holes 31, 32 form a coolant supply and discharge tube along the stacking direction. In this case, it is not needed to separately add a coolant supply and discharge component, thereby saving costs and allowing a compact design of the battery module.

In the cooling jacket 10 described above, one end of the coolant supply manifold channel 210 and one end of the coolant discharge manifold channel 220 may be connected directly to the coolant supply and discharge tubes, respectively. Thus, the battery module may circulate the coolant through the coolant supply and discharge tubes formed by assembling the stacking frames, and the cooling jackets 10 may be connected to the coolant supply and discharge tubes and receive the coolant therethrough to cool the battery cells 20.

Meanwhile, the battery module may further include various devices (not shown) for controlling charge and discharge of the battery cells 20, for example a battery management system (BMS), a current sensor, a fuse and the like. The battery module may be used as an energy source for an electric vehicle, a hybrid electric vehicle, or a power storage system.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these terms are selected merely for convenience in explanation and may vary based on a location of a target or an observer.

What is claimed is:

1. A cooling jacket configured to be disposed close to one surface of a battery cell to absorb heat of the battery cell, the cooling jacket comprising:
    a cooling plate defining a plate shape; and
    a plurality of cooling channels extending within the cooling plate, wherein the plurality of cooling channels include:
        a coolant supply manifold channel and a coolant discharge manifold channel respectively disposed at first and second sides of the cooling plate and each extending in a longitudinal direction from an inside of the cooling plate to an outside of the cooling plate so that one end thereof is exposed to the outside of the cooling plate; and
        non-uniform cooling channels each extending in a lateral direction perpendicular to the longitudinal direction and spaced apart from each other by a predetermined distance and each having first and second ends respectively connected to the coolant supply manifold channel and the coolant discharge manifold channel, the non-uniform cooling channels having widths that are non-uniform in the longitudinal direction,
    wherein the widths of the non-uniform cooling channels are gradually increased from a first end of the cooling plate to a second end of the cooling plate, the first end being remote from a drawing portion of an electrode lead of the battery cell, and the second end being adjacent to the drawing portion,
    the non-uniform cooling channels at the first end being configured to have a first flow rate, the non-uniform cooling channels at the second end being configured to have a second flow rate greater than the first flow rate, such that the non-uniform cooling channels at the second end adjacent to the drawing portion have a heat removing capacity greater than a heat removing capacity of the non-uniform cooling channels at the first end remote from the drawing portion.

2. The cooling jacket according to claim 1, wherein each of the plurality of non-uniform cooling channels has a tubular shape and is embedded inside of the cooling plate.

3. The cooling jacket according to claim 1, wherein the cooling plate has first and second edge portions respectively formed at the first and second sides of the cooling plate and each extending in the longitudinal direction of the cooling plate, the first and second edge portions of the cooling plate each having a thickness that is greater than a thickness of other portions of the cooling plate in a height direction perpendicular to the longitudinal direction.

4. The cooling jacket according to claim 1, wherein the plurality of cooling channels are formed integrally with the cooling plate.

5. The cooling jacket according to claim 4, further comprising first and second flexible connection tubes respectively coupled to an opening of the coolant supply manifold channel and an opening of the coolant discharge manifold channel.

6. The cooling jacket according to claim 1, wherein the first and second ends of each of the non-uniform cooling channels have a rounded shape.

7. A battery module, comprising:
    a plurality of the cooling jackets each according to claim 1,
    a plurality of battery cells interleaved with the cooling jackets, such that each battery cell closely contacts an upper surface of a lower adjacent one of the cooling jackets and a lower surface of an upper adjacent one of the cooling jackets; and
    stacking frames supporting the cooling jackets and the battery cells and assembled with each other so as to be stacked in a height direction perpendicular to the longitudinal direction,
    wherein the stacking frames together form first and second holes extending in the height direction that respectively serve as a coolant supply tube and a coolant discharge tube, and the one end of the coolant supply manifold channel and the one end of the coolant discharge manifold channel are respectively connected to the coolant supply tube and the coolant discharge tube.

* * * * *